(12) United States Patent
Watabe et al.

(10) Patent No.: US 6,741,546 B2
(45) Date of Patent: May 25, 2004

(54) INFORMATION RECORDING MEDIUM, INFORMATION RECORDING APPARATUS, AND INFORMATION REPRODUCTION APPARATUS

(75) Inventors: Kazuo Watabe, Yokohama (JP); Hideo Ando, Hino (JP); Masaaki Matsumaru, Funabashi (JP); Chosaku Noda, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 302 days.

(21) Appl. No.: 10/073,911

(22) Filed: Feb. 14, 2002

(65) Prior Publication Data

US 2002/0114228 A1 Aug. 22, 2002

(30) Foreign Application Priority Data

Feb. 16, 2001 (JP) ........................................ 2001-040621

(51) Int. Cl.[7] .................................................. G11B 7/00
(52) U.S. Cl. ................. 369/275.3; 369/47.27; 369/59.25; 369/44.13
(58) Field of Search ............................ 369/44.13, 44.26, 369/44.27, 44.34, 47.1, 47.2, 47.21, 47.22, 47.27, 47.46, 47.47, 53.1, 59.1, 59.25, 275.1, 275.2, 275.3, 275.4

(56) References Cited

U.S. PATENT DOCUMENTS 5,872,767 A * 2/1999 Nagai et al. ............. 369/275.3
6,459,661 B1 * 10/2002 Iwanaga .................. 369/275.3

FOREIGN PATENT DOCUMENTS

JP 10-27349 1/1998
JP 10-124947 5/1998

* cited by examiner

Primary Examiner—Muhammad Edun
(74) Attorney, Agent, or Firm—Oblon, Spivak, McClelland, Maier & Neustadt, P.C.

(57) ABSTRACT

An information recording medium has a recording track, a plurality of address areas which are formed on the recording track and record address information, and mark areas, the number of which is larger than the number of address areas, and which are formed at predetermined intervals and include mark information. Each address area records address information by means of pits, and each mark area records mark information by means of wobbles as a part of a track boundary.

15 Claims, 7 Drawing Sheets

INFORMATION RECORDING MEDIUM, INFORMATION RECORDING APPARATUS, AND INFORMATION REPRODUCTION APPARATUS

CROSS-REFERENCE TO RELATED APPLICATIONS

This application is based upon and claims the benefit of priority from the prior Japanese Patent Application No. 2001-040621, filed Feb. 16, 2001, the entire contents of which are incorporated herein by reference.

BACKGROUND OF THE INVENTION

1. Field of the Invention

The present invention relates to an information recording medium such as an optical disk or the like. The present invention also relates to an information recording apparatus for recording objective information on the information recording medium of the present invention. Furthermore, the present invention relates to an information reproduction apparatus for reproducing objective information recorded on the information recording medium.

2. Description of the Related Art

In recent years, large-capacity information recording media such as DVD and the like have been extensively studied and developed. On a DVD-RAM that belongs to a DVD group, a single spiral track is formed. On the single spiral track, land and groove tracks alternately appear every rotation. Data is recorded on these tracks of the DVD-RAM in units called sectors. On a DVD-RAM, a pre-pit header (CAPA) is formed for each sector. The pre-pit header records address information by pre-pits. Japanese Patent Application No. 2000-303855 discloses a technique that pertains to the pre-pit header.

On the other hand, on a DVD-RW that belongs to the DVD group, no pre-pit headers are formed, and notched pits (land pre-pits) are formed on each land track (land portion) sandwiched between neighboring groove tracks. The land pre-pits indicate address information. In this case, an address is determined based on information from land pre-pits obtained by reproducing data for 16 sectors (=1 ECC block) as a whole. Jpn. Pat. Appln. KOKAI Publication No. 10-27349 discloses a technique that pertains to notched pits.

As described above, since the pre-pit header is formed on the DVD-RAM for each sector, the address can be determined for each sector upon reproducing the DVD-RAM. Also, concentric areas called zones are defined on the DVD-RAM, and 1,000 or more tracks are formed per zone. Pre-pit header fields are aligned in the radial direction within at least one zone. Therefore, even when tracking of a light beam has deviated from a target track during write, the next reproduction timing of a pre-pit header can be predicted. That is, by reading an address from the pre-pit header, any tracking error can be detected. In this manner, erroneous erasure (erroneous recording) due to such tracking errors during write can be restricted to one sector in the worst case. If an erroneously erased (recorded) region falls within one sector, it can be corrected by an ECC (Error Correction Code).

On the other hand, the DVD-RW has no pre-pits for each sector. When tracking of a light beam has deviated from a target track during write, a tracking error cannot be detected immediately. If a tracking error is to be detected based on an address determined by information from land pre-pits obtained by reproducing data for 16 sectors, erroneous erasure due to such tracking errors during write runs to a maximum of 16 sectors.

On the DVD-RAM, data destruction due to erroneous erasure caused by tracking errors during write is not so serious. However, since pre-pit headers are formed for respective sectors, the recording region of user data decreases. That is, the format efficiency lowers.

On the other hand, the DVD-RW does not suffer any format efficiency drop due to the header layout, since user data is continuously recorded on tracks. However, data destruction caused by tracking errors during write is likely to be serious.

That is, it is difficult for the conventional DVD-RAM and DVD-RW to attain both a reduction of the data destruction region due to erroneous erasure caused by tracking errors during write, and suppression of format efficiency drop.

BRIEF SUMMARY OF THE INVENTION

It is an object of the present invention to provide an information recording medium that can solve the aforementioned problems.

(1) An information recording medium according to an embodiment of the present invention comprises a recording track, a plurality of address areas which are formed on the recording track and record address information, and mark areas, the number of which is larger than the number of address areas, and which are formed at predetermined intervals and include mark information.

(2) An information recording apparatus according to the embodiment of the present invention records objective information on an information recording medium, the information recording medium comprises a recording track, a plurality of address areas which are formed on the recording track and record address information, and mark areas, the number of which is larger than the number of address areas, and which are formed at predetermined intervals and include mark information, and the information recording apparatus according to the embodiment of the present invention comprises mark detection section configured to detecting the mark information from the mark areas, tracking control section configured to monitoring a tracking error based on the mark information detected by the mark detection section, and controlling a light beam to track the recording track, and recording section configured to reading the address information from the address areas, and recording predetermined information at a target position of the recording track on the basis of the read address information.

(3) An information reproduction apparatus according to the embodiment of the present invention reproduces objective information from an information recording medium, the information recording medium comprises a recording track, a plurality of address areas which are formed on the recording track and record address information, and mark areas, the number of which is larger than the number of address areas, and which are formed at predetermined intervals and include mark information, and the information reproduction apparatus according to the embodiment of the present invention comprises mark detection section configured to detecting the mark information from the mark areas, tracking control section configured to monitoring a tracking error based on the mark information detected by the mark detection section, and controlling a light beam to track the recording track, and reproduction section configured to reading the address information from the address areas, and reproducing predetermined information from a target position of the recording track on the basis of the read address information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Important points of an information recording medium according to the embodiment of the present invention will be explained first.

The information recording medium according to the embodiment of the present invention independently comprises physical address portions (address portions) used to determine addresses with high precision, and detection pattern portions (mark areas) used to detect any tracking errors.

More specifically, the information recording medium according to the embodiment of the present invention has the following points.

User data can be recorded on a recording track along a detection pattern portion. That is, formation of detection pattern portions does not decrease the storage capacity of the medium.

A recordable data length between successive detection pattern portions is that for one sector. One sector is correctable by an ECC. That is, even when all data between successive detection pattern portions is destroyed (erroneously erased), it can be restored by an ECC.

A detection pattern is recorded by wobbles (wobbled boundary wall) of a groove. Alternatively, a detection pattern is recorded by land pre-pits. Alternatively, a detection pattern is recorded by a linear boundary wall.

Since the physical address and detection pattern are separately arranged, they can be independently detected. Hence, a detection failure of one of the physical address and detection patterns does not disturb detection of the other.

The embodiment of the present invention will be described hereinafter with reference to the accompanying drawings.

Figure 1:
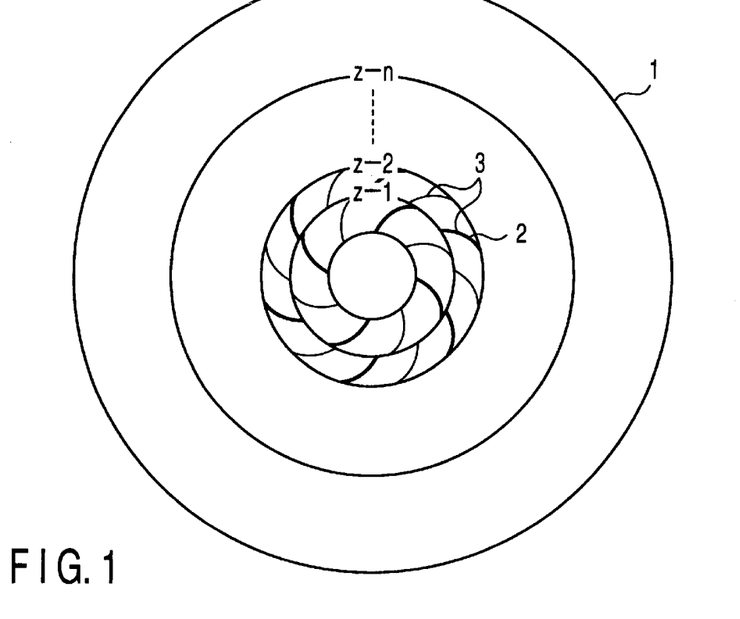
FIG. 1 shows a first example of an information recording medium according to the embodiment of the present invention.

FIG. 1 shows an information recording medium (optical disk 1) according to the embodiment of the present invention. In this embodiment, an optical disk 1 adopts a ZCLV (Zoned Constant Linear Velocity) structure as in the DVD-RAM.

That is, an optical disk 1 is partitioned into n zones Z-1, Z-2, . . . , Z-n having given radial widths from the inner periphery side. When one zone undergoes recording/reproduction, this zone is rotated at a given angular velocity (rotational speed). That is, the angular velocity is controlled so that the rotational speed for each zone becomes constant. The angular velocity is controlled to become lower from the inner to outer zones. That is, the angular velocity is controlled to obtain a nearly constant linear velocity on the entire disk surface.

In each zone, the number of sectors per track is constant. In each track, header fields 2 are arranged one for, e.g., every two sectors. The header field 2 records physical address information used to determine an address. The header fields 2 of tracks which neighbor in the radial direction of the disk are offset by predetermined lengths from each other in the tangential direction of the tracks. Immediately before each header field 2, a sector mark field (mark area) 3 is formed. The sector mark fields 3 are arranged one for, e.g., each sector. When the header fields 2 are arranged one for every two sectors, the sector mark fields 3 are arranged immediately before (or immediately after) the header field 2 and between neighboring header fields 2. Of course, the sector mark field 3 alone is arranged between neighboring header fields 2.

In the present invention, the interval between neighboring header fields 2 is not particularly limited as long as it is one sector or more. For example, an interval for four sectors or eight sectors may be set. User data cannot be recorded on each header field 2. That is, the ratio of user data to the capacity of the entire disk can be increased with an increasing interval between neighboring header fields 2. In other words, the format efficiency can be improved. Hence, the optical disk of the present invention can practically improve the format efficiency compared to the DVD-RAM format in which one header field is formed for each individual sector.

On the other hand, the interval between neighboring sector mark fields 3 is not particularly limited as long as it is shorter than that between neighboring header fields 2. For example, if the interval between neighboring sector mark fields 3 is one sector, an effect equivalent to the erroneous erasure prevention effect of the header fields of the DVD-RAM is expected. User data can be recorded on the sector mark fields 3. That is, even when sector mark fields 3 are arranged at short intervals, the format efficiency does not suffer. Hence, the interval between neighboring sector mark fields 3 is not particularly limited as long as it is shorter than that between neighboring header fields 2. Assume that ECC error correction performance can correct data with a size for, e.g., 1.5 sectors. In this case, if one sector mark field 3 is arranged for each individual sector, even when all data between neighboring sector mark fields 3 are destroyed, they can be corrected by the ECC. Therefore, when the header fields 2 that record physical address information and sector mark fields 3 (sector areas) used to detect any tracking errors are separately formed, an optical disk that can limit erroneous erasure due to tracking errors during write to fall within a restorable range while minimizing any format efficiency drop can be provided.

Details of the sector mark fields 3 will be explained below with reference to FIGS. 2 to 4.

Figure 2:
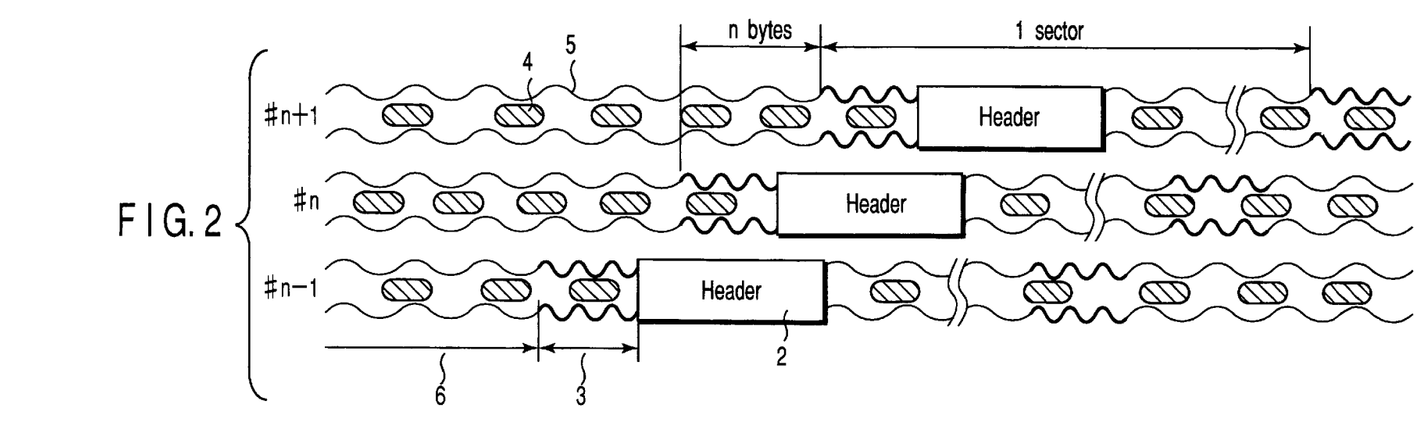
FIG. 2 is an enlarged view of tracks on the information recording medium shown in FIG. 1, and shows a first layout example of header fields and sector mark fields.

FIG. 2 is an enlarged view showing an example of tracks on the optical disk 1. FIG. 2 shows a case of a groove recording scheme in which recording marks 4 are recorded on only guide grooves (grooves) on the optical disk 1. Groove and land tracks are formed on the optical disk 1 to alternate in its radial direction. In the groove recording scheme, user data are recorded on only groove tracks (#n+1, #n, #n−1). Each groove 5 is wobbled at a given frequency. When the disk is rotated at a prescribed rotational speed, the given frequency can be detected from the wobbles of the groove 5. The wobbles of the groove 5 indicate the given frequency. That is, clocks can be extracted based on the wobbles synchronous with rotation.

Each header field 2 stores information indicating a physical address. The information indicating a physical address is formed by embossed pits. A sector mark field 3 is formed immediately before the header field 2. The sector mark field 2 contains a sector mark. The sector mark is formed by wobbles different from those of the groove 5. The groove 5 is formed with a reference frequency field 6 (wobbles). By contrast, the sector mark field 3 is formed by wobbles to define a frequency, e.g., twice that defined by the reference frequency field 6. The wobbles that define the double frequency form a sector mark. The header fields 2 on neighboring tracks in the radial direction are offset by a given length (for n bytes) from each other in the tangential direction of the tracks. Likewise, the sector mark fields 2 are arranged to be offset by a given length.

Upon recording data on the optical disk 1 or reproducing data from the optical disk 1, a wobble signal obtained from wobbles can be reproduced at the same time. Hence, upon recording or reproducing data along tracks, sector marks in the sector mark fields 3 are always read out for respective sectors. In other words, sector marks are read out at given intervals. If a beam spot has deviated from a target track to a neighboring track during recording/reproduction of data, sector marks cease to be read out at given intervals. This is because the position of each sector mark field 3 on the target track is offset by a given length from that on the neighboring track in the tangential direction of the tracks. Therefore, by detecting a reproduction interval difference of sector marks, tracking errors can be detected. The sector marks shift n bytes every time a beam spot has deviated one track. That is, when the beam spot has deviated m tracks, the interval between the sector marks shifts m·n bytes. Therefore, the number of tracks the beam spot has deviated can be detected from the difference of the sector mark interval.

Figure 3:
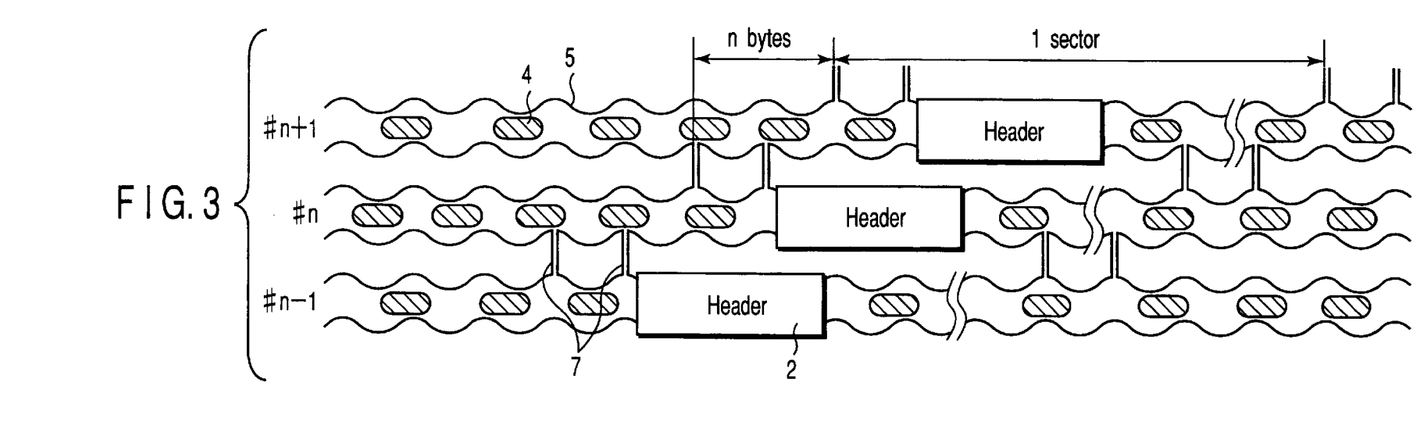
FIG. 3 is an enlarged view of tracks on the information recording medium shown in FIG. 1, and shows a second layout example of header fields and sector mark fields.

FIG. 3 is an enlarged view showing another example of tracks on the optical disk 1. The same reference numerals in FIG. 3 denote the same fields having the same functions as in FIG. 2. FIG. 3 also shows a case of the groove recording scheme that records recording marks 4 on only grooves on the optical disk 1. Each groove 5 is wobbled at a given frequency. The example of FIG. 3 is characterized in that the sector mark fields 7 are formed by pre-pits on a land (land track) between neighboring groove tracks. In case of the groove recording scheme, no user data is recorded on lands. Hence, even when the sector mark fields 7 are formed by pre-pits on lands, the user data recording region never decreases.

Figure 4:
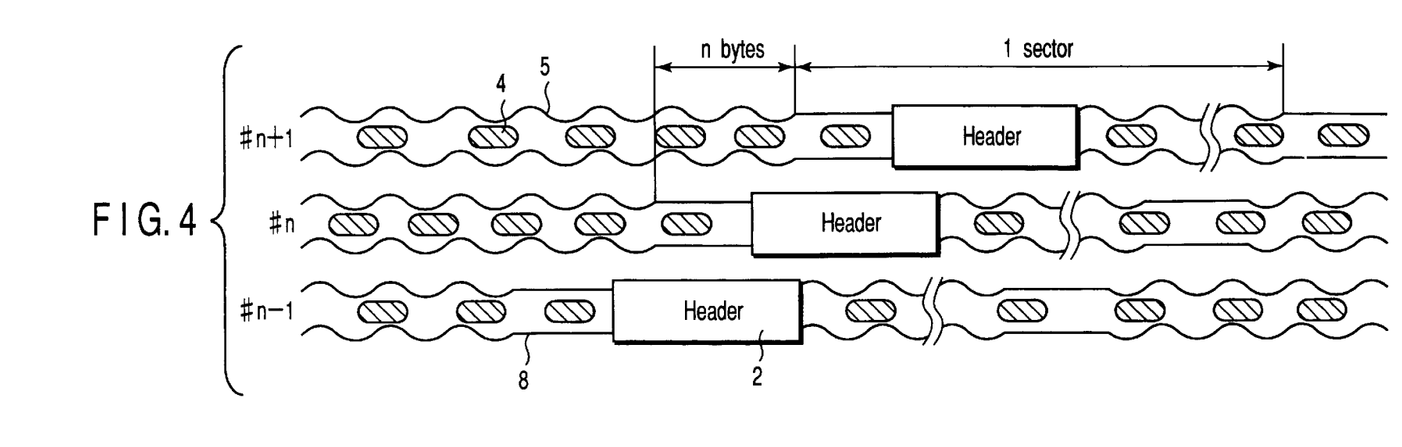
FIG. 4 is an enlarged view of tracks on the information recording medium shown in FIG. 1, and shows a third layout example of header fields and sector mark fields.

FIG. 4 is an enlarged view showing still another example of tracks on the optical disk 1. In this embodiment, each groove 5 is wobbled at a given frequency. By contrast, sector mark fields 8 are formed by a non-wobbled groove (linear). In this case, a wobble signal is interrupted by each sector mark field 8. This interrupt serves as a sector mark signal. In this way, the same effect as the aforementioned sector mark field can be obtained.

On the aforementioned optical disk 1, the header fields 2 that store physical address information are formed on tracks to occupy a given region. An optical disk 11 according to an embodiment of the present invention will be described below with reference to FIG. 5. The optical disk 11 shown in FIG. 5 has no header fields concentrated on groove tracks unlike the optical disk 1 shown in FIG. 1, i.e., like a DVD-RW. Note that the disk adopts the ZCLV structure as in the optical disk 1 in FIG. 1.

Figure 5:
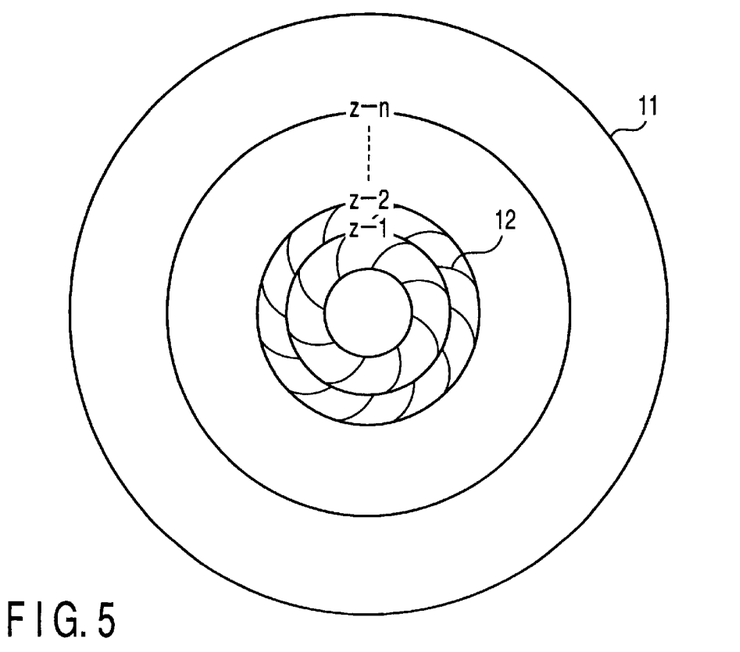
FIG. 5 shows a second example of an information recording medium according to the embodiment of the present invention.

Sector mark fields 12 are arranged one for each sector on tracks of the optical disk 11. The sector mark fields 12 on tracks which neighbor in the radial direction are offset from each other by a given length in the tangential direction of tracks. Also, this optical disk 11 has no header fields for storing physical addresses. In place of the header fields, for example, wobbles of tracks are used. A physical address signal can be obtained from a wobble signal obtained from the wobbles. In this case, since there is no factor (header fields) that decreases the user data recording region, high format efficiency can be achieved. However, in such a scheme for obtaining a physical address from the wobbles of a track, read access over a long region (e.g., for 16 sectors) is required to determine one address. Therefore, if a tracking error has occurred during data recording, recorded data may be destroyed over a long region beyond ECC error correction performance. To prevent this, the sector mark fields 12 are arranged on the optical disk 11. With these marks, the disk is free from damage of erroneous erasure in practice. Also, user data can be recorded on the sector mark fields 12 as in the optical disk 1. That is, a format efficiency drop can be prevented. Therefore, since the physical address portions (wobbles) and sector mark fields 12 are independently formed even on the optical disk with a format having no concentrated header fields, an optical disk that can limit data destruction caused by erroneous erasure due to tracking errors during write to fall within a restorable range without any format efficiency drop can be provided.

Figure 6:
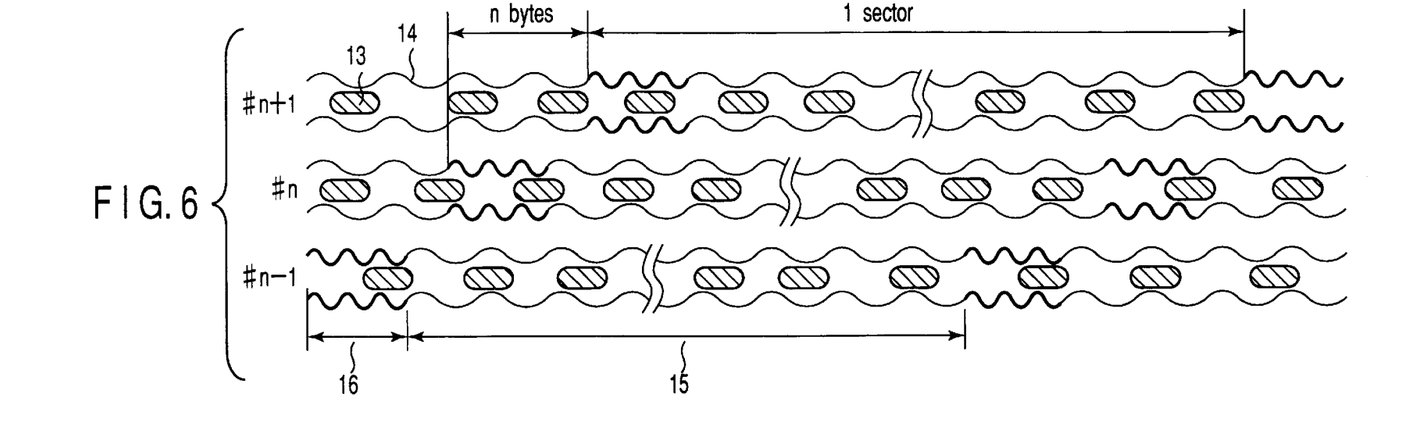
FIG. 6 is an enlarged view of tracks on the information recording medium shown in FIG. 5, and shows a first layout example of header fields and sector mark fields.
Figure 7:
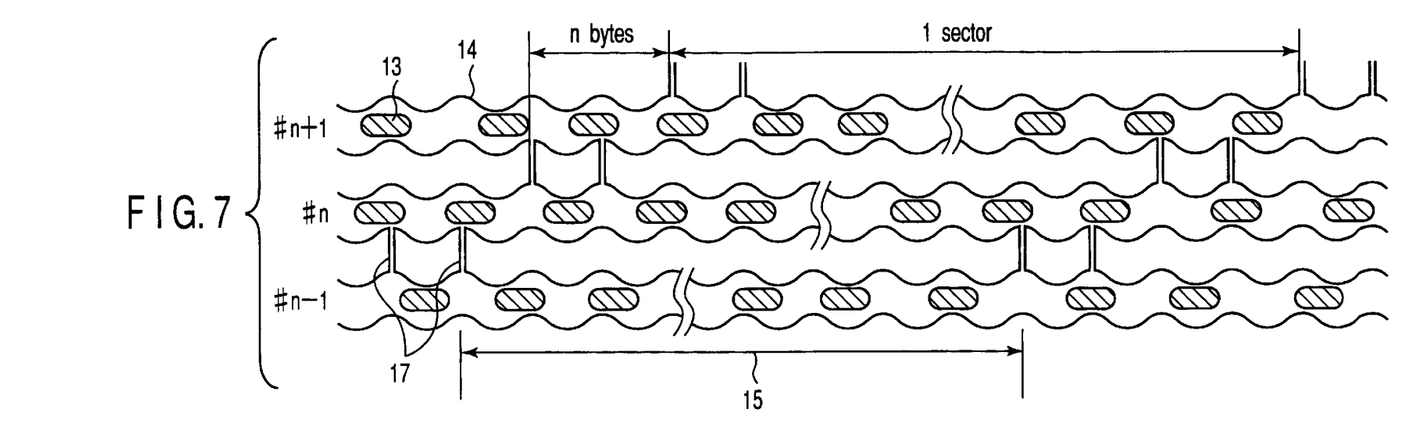
FIG. 7 is an enlarged view of tracks on the information recording medium shown in FIG. 5, and shows a second layout example of header fields and sector mark fields.
Figure 8:
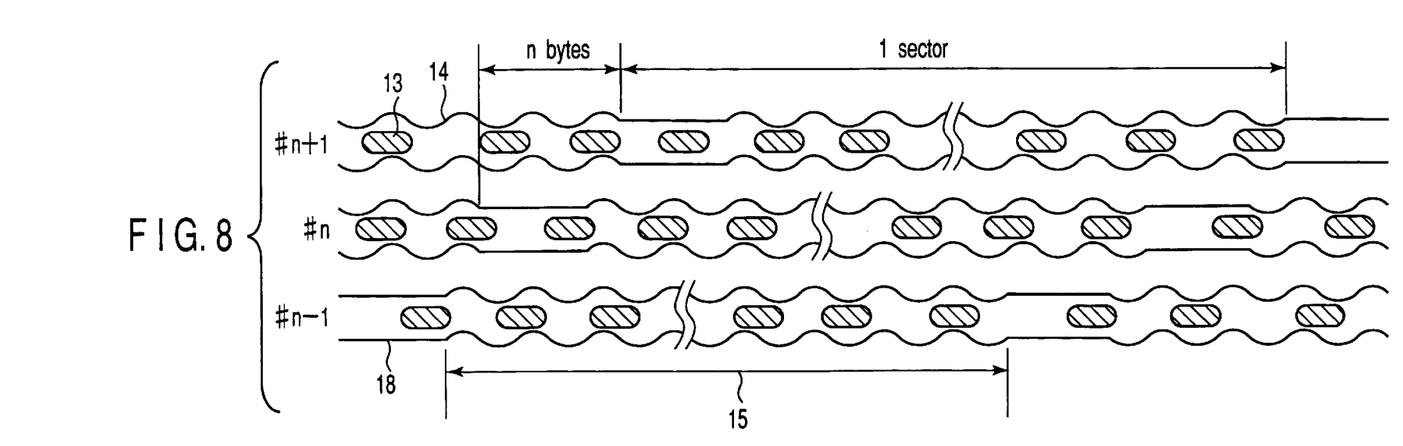
FIG. 8 is an enlarged view of tracks on the information recording medium shown in FIG. 5, and shows a third layout example of header fields and sector mark fields.

FIGS. 6 to 8 show details of the sector marks 3 on the optical disk 11.

FIG. 6 is an enlarged view showing an example of tracks on the optical disk 11. FIG. 6 shows a case of the groove recording scheme in which recording marks 13 are recorded on only guide grooves (grooves) on the optical disk 11. Each groove 14 is wobbled. An ID field 15 stores physical address information by frequency or phase modulation or the like of wobbles. Also, each sector mark field 16 is formed by wobbling a groove. The wobbles of the sector mark field 16 and ID field 15 define frequencies which can be distinguished from each other. The sector mark field 16 is always arranged at the head position of address information (wobbles) contained in the ID field 15. Furthermore, the sector mark fields 16 are arranged one for, e.g., each sector. The ID fields 15 and sector mark fields 16 on tracks which neighbor in the radial direction are offset from each other by a predetermined length (n bytes) in the tangential direction. On groove tracks including the ID fields 15 and sector mark fields 16, recording marks 13 as user data can be recorded over the entire region. The optical disks 1 and 11 shown in FIGS. 1 and 5 use the same tracking error detection method during data recording/reproduction except for the storage locations of the physical address information. That is, a tracking error can be detected by detecting a difference of the reproduction intervals of sector marks obtained from the sector mark fields.

FIG. 7 is an enlarged view showing another example of tracks on the optical disk 11. The same reference numerals in FIG. 7 denote the same fields having the same functions as in FIG. 6. FIG. 7 also shows a case of the groove recording scheme that records recording marks 13 on only grooves on the optical disk 11. Each groove 14 is wobbled at a given frequency, and a wobble signal obtained from wobbles contains physical address information. FIG. 7 is characterized in that sector marks 17 are formed by pre-pits on a land. The sector marks 17 can be reproduced even during recording/reproduction on groove tracks.

FIG. 8 is an enlarged view showing still another example of tracks on the optical disk 11. In this embodiment, physical address information is stored as wobbles ID fields 15 of each groove 14. Also, this embodiment is characterized in that only sector mark fields 18 are formed by a non-wobbled groove (linear). In this case, a wobble signal is interrupted by each sector mark field 18. This interrupt serves as a sector mark signal. In this way, the same effect as the aforementioned sector mark field can be obtained.

Figure 9:
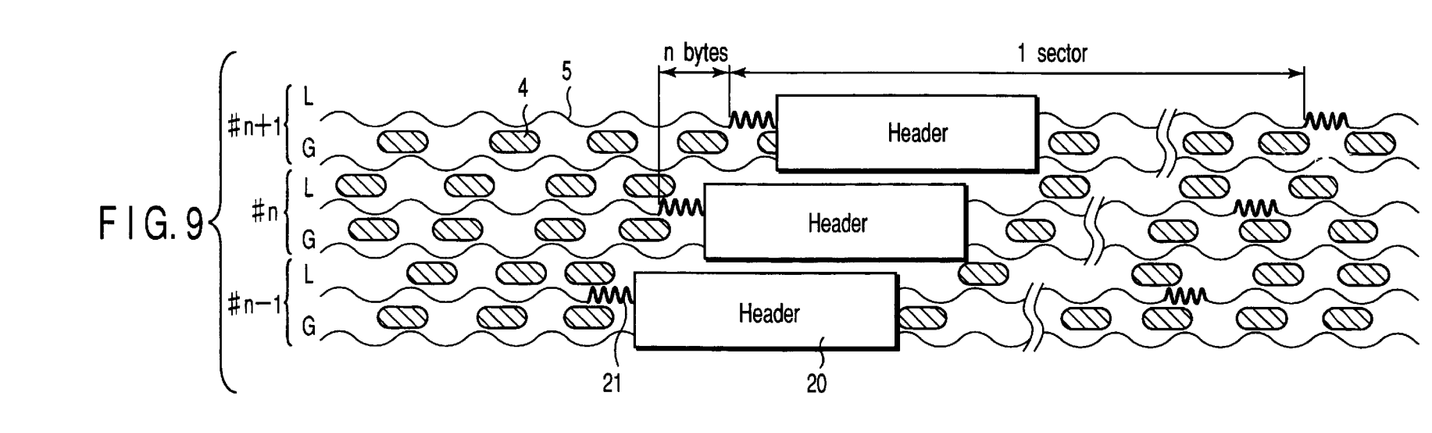
FIG. 9 is an enlarged view of tracks on the information recording medium shown in FIG. 1, and shows a fourth layout example of header fields and sector mark fields.

FIG. 9 is an enlarged view showing still another example of tracks on the optical disk 1. FIG. 9 shows a case of a land & groove recording scheme that records recording marks 4 on both guide grooves (grooves) and lands between neighboring guide grooves (grooves) on the optical disk 1. Each groove 5 is wobbled at a predetermined frequency. Header fields 20 are formed to extend across both the land and groove, and a sector mark field 21 is formed immediately before each header field 20. Strictly speaking, the sector mark field 21 is formed on the boundary portion between the land and groove. By forming such sector mark fields 21, marks for respective sectors can also be provided, and the effect of the present invention can be obtained even for an optical disk that adopts the land & groove recording scheme.

Figure 10:
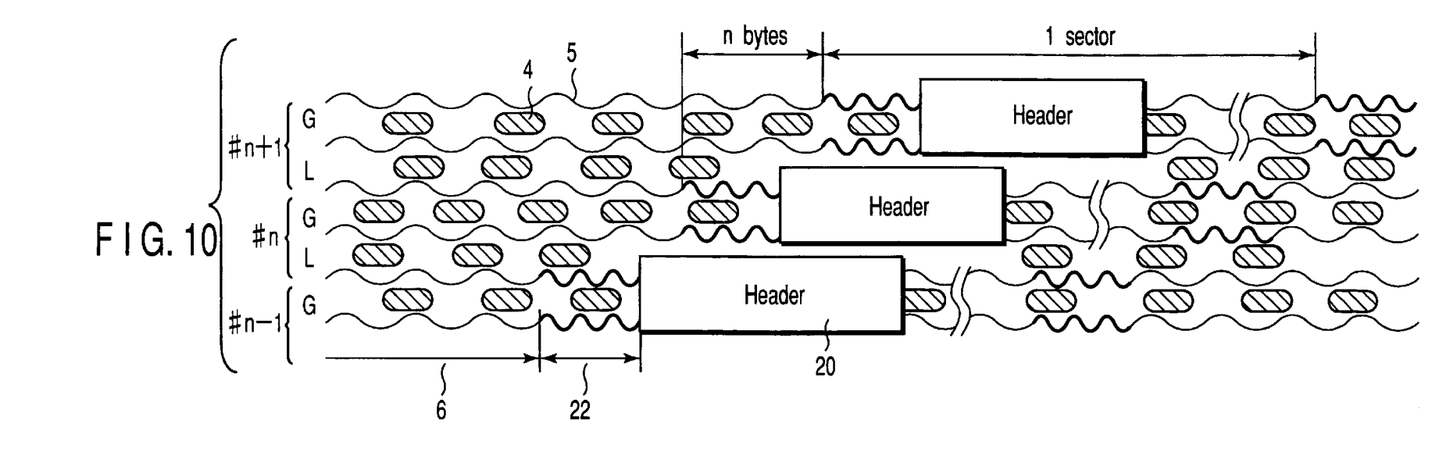
FIG. 10 is an enlarged view of tracks on the information recording medium shown in FIG. 1, and shows a fifth layout example of header fields and sector mark fields.

FIG. 10 is an enlarged view showing still another example of tracks on the optical disk 1. As in the example shown in FIG. 9, the optical disk 1 adopts the land & groove recording scheme. Sector marks included in each sector mark field 22 are defined by wobbles of two walls of each groove 5. In this case, the frequency of the wobbles of the sector mark field 22 is, e.g., twice that of the reference frequency field 6. The detection method of sector marks included in this sector mark field 22 is the same as that already described above.

Figure 11:
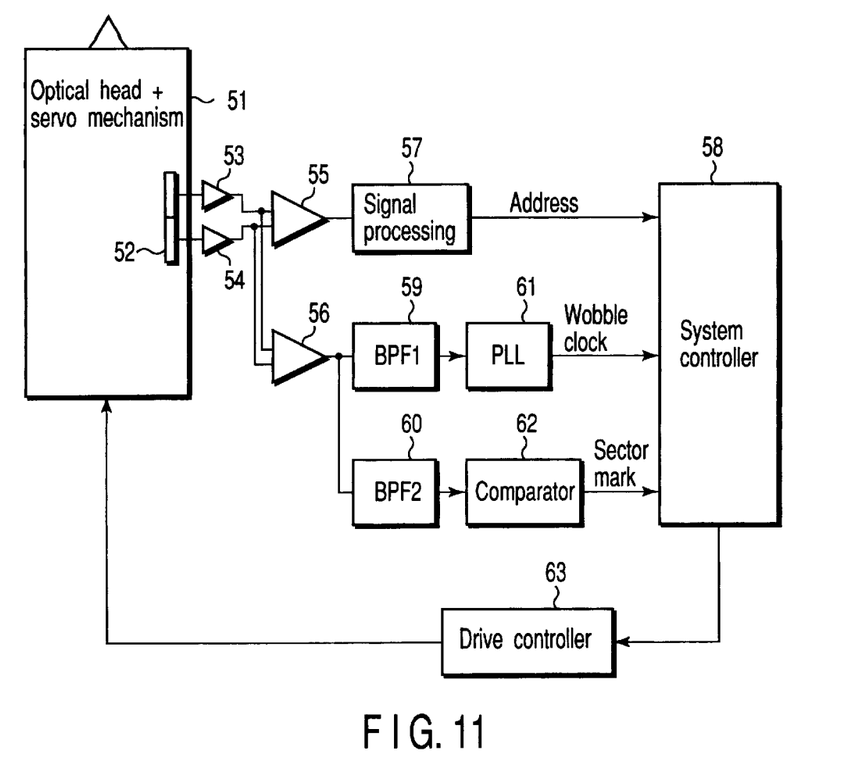
FIG. 11 is a block diagram showing an example of an information reproduction apparatus and information recording apparatus according to the embodiment of the present invention.

FIG. 11 shows a schematic arrangement of an optical disk apparatus (information recording apparatus or information reproduction apparatus) according to an embodiment of the present invention.

The optical disk apparatus shown in FIG. 11 comprises an optical head & servo mechanism 51, photodetector 52, amplifiers 53 and 54, adder 55, subtractor 56, signal processing circuit 57, system controller 58, band-pass filter (BPF1) 59, band-pass filter (BPF2) 60, PLL 61, comparator 62, and drive controller 63.

The optical head & servo mechanism 51 has a light source, and a focusing means for focusing a light beam (a light beam for reproduction or recording) emitted by the light source on an optical disk (optical disk 1 or 11). Under the servo control of the optical head & servo mechanism 51, a light beam for reproduction scans along tracks on the optical disk upon reproducing data. Upon recording data, a light beam for recording scans along tracks on the optical disk.

Upon reproducing objective data from the optical disk and recording objective data on the optical disk, address information and sector marks are reproduced to execute a process for accessing a target address as follows while monitoring tracking errors on the basis of the reproduced sector marks.

Light reflected by the optical disk 1 is detected by the photodetector 52 provided to the optical head & servo mechanism 51. That is, reflected light is received, and is converted into an electrical signal. The photodetector 52 is split into two cells by a split line parallel to the track tangential direction. Signals from the respective cells are amplified by the amplifiers 53 and 54, and are input to the adder 55 and subtractor 56. The output signal from the adder 55 undergoes an equalization process, binarization process, and demodulation process in the signal processing circuit 57. As a result, address information is reproduced from embossed pits recorded on each header field 2. Upon reproducing data, user data is also reproduced from recording marks on the tracks. The reproduction result is sent to the system controller 58.

On the other hand, the signal output from the subtractor 56 is a difference signal in a disk radial direction, i.e., a so-called push-pull signal. This push-pull signal undergoes band limitation in the band-pass filters 59 and 60. The output from the band-pass filter 59 is a signal extracted from the reference frequency field 6 on each groove. The PLL 61 generates clocks in synchronism with rotation of the disk. On the other hand, the band-pass characteristics of the band-pass filter 60 are set to be higher than the pass band of the band-pass filter 59. That is, the band-pass filter 60 can detect only a signal of the sector mark field which is wobbled at a frequency twice the reference frequency. The output signal from the band-pass filter 60 is binarized by the comparator 62 to obtain a sector mark detect signal, which is sent to the system controller 58.

Figure 12:
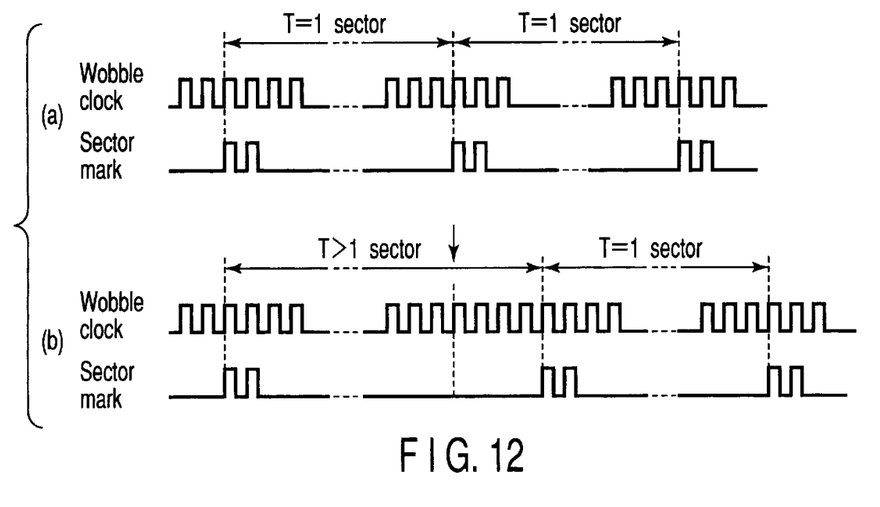
FIG. 12 is a timing chart showing the relationship between wobble clocks and sector mark fields.

FIG. 12 shows the output signals from the PLL 61 and comparator 62. (a) of FIG. 12 shows signals which are reproduced normally, i.e., a state wherein a light beam tracks a target track. A wobble clock signal output from the PLL 61 becomes a signal which always has a constant frequency, during reproduction. On the other hand, a sector mark signal output from the comparator 62 always has a signal interval for one sector. By contrast, (b) of FIG. 12 shows a state wherein a light beam has deviated from a target track during reproduction. The interval of the sector mark signal becomes broader than that in a normal state to have a position where the light beam has deviated from the target track (indicated by an arrow in FIG. 12) as a start point. Hence, the system controller 58 monitors the wobble clock signal and sector mark signal, thus detecting any tracking error. Upon detecting any tracking error during data recording/reproduction, the system controller 58 instructs the drive controller 63 to cancel recording/reproduction. The drive controller 63 sends a stop command of recording/reproduction pulse modulation of the light source to the optical head & servo mechanism 51.

When one header field is arranged for several sectors as in the examples shown in FIGS. 2 to 4, the sector mark interval at the position where the header field is arranged becomes longer than one sector by a header length. Since this difference in the interval is known in advance, the control is made not to detect that increase in interval as a tracking error.

Figure 13:
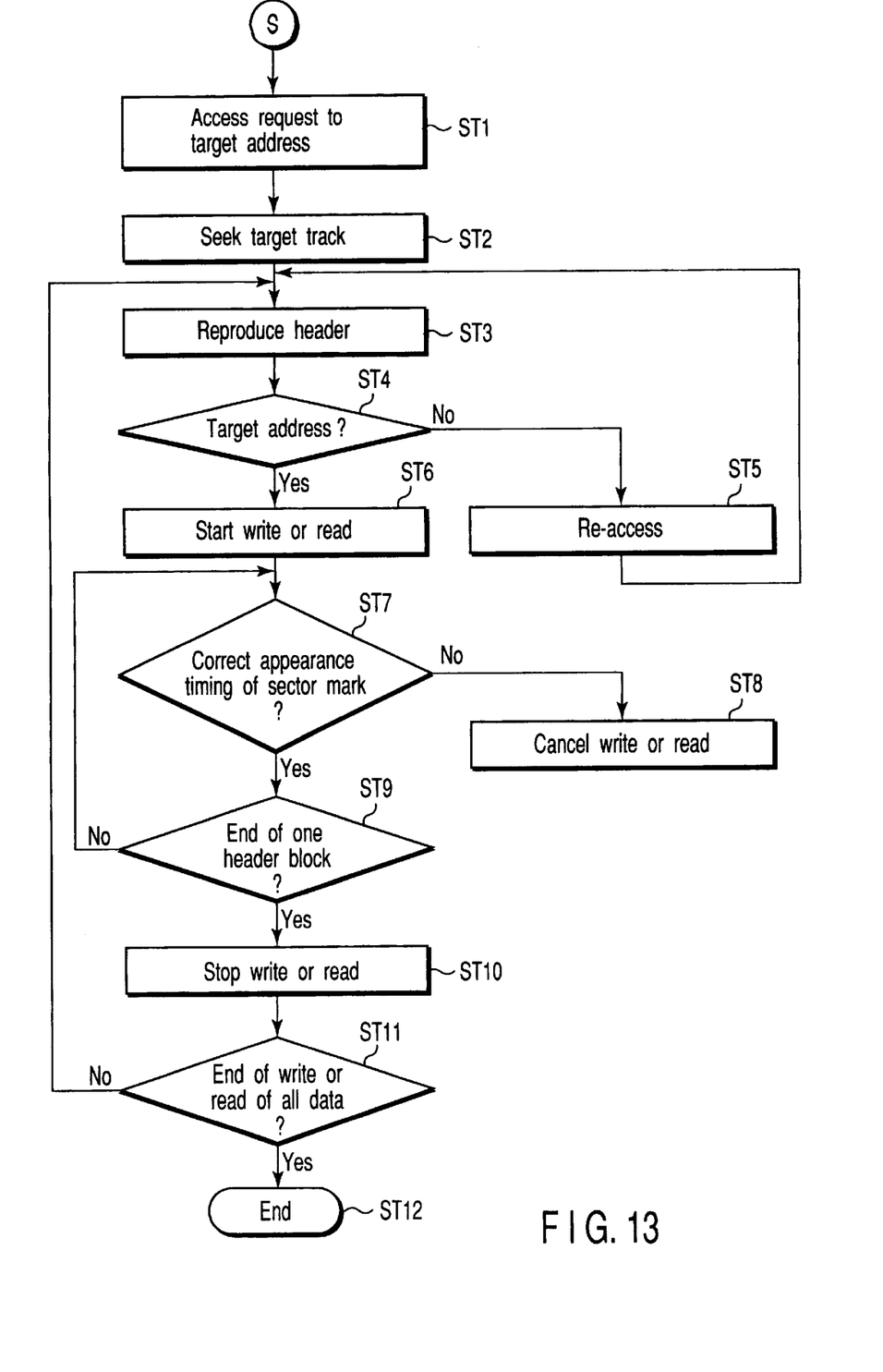
FIG. 13 is a flow chart showing read and write processes.

FIG. 13 is a flow chart showing the read/write process.

Upon executing a read or write process, an access request to a read or write target address is input to the system controller 58 (ST1). The system controller 58 instructs the drive controller 63 to seek the target track (ST2). A header is reproduced to confirm an address (ST3). It is checked if the reproduced address is the read or write target address (ST4). If the reproduced address is not the target address, re-access is made (ST5). Upon completion of access to the read or write target address, read or write starts (ST6). During the read or write access, the appearance intervals of sector marks are always monitored to check based on the appearance intervals if tracking is normally being done (ST7). If any tracking error is detected, the read or write process is immediately canceled (ST8). If the appearance intervals of sector marks are normal, the read or write access continues until data is read out from or written in one header block (ST9). Upon completion of data read or write in one header block, the read or write access is temporarily stopped (ST10) to check if data to be read out or written still remains (ST11). If data to be read out or written still remains, the flow returns to step ST1 to reproduce a header. In this way, upon completion of read or write of all data, the read or write process normally ends (ST12).

According to the aforementioned invention, an information recording medium which can prevent data destruction caused by tracking errors of a light beam without decreasing the recording capacity of user data can be provided.

Also, according to the present invention, an information recording apparatus, which can immediately cope with tracking errors of a light beam and can record objective information on an information recording medium, and can prevent data destruction caused by tracking errors of a light beam without decreasing the recording capacity of user data, can be provided.

Furthermore, according to the present invention, an information reproduction apparatus, which can immediately cope with tracking errors of a light beam and can reproduce objective information from an information recording medium, and can prevent data destruction caused by tracking errors of a light beam without decreasing the recording capacity of user data, can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording medium comprising:

a recording track;

a plurality of address areas which are formed on said recording track and record address information; and mark areas, the number of which is larger than the number of address areas, and which are formed at predetermined intervals and include mark information.

2. A medium according to claim 1, wherein the mark information of each mark area is independent from the address information, and can be present simultaneously with user data.

3. A medium according to claim 1, wherein said recording track stores data for respective sectors, and said mark areas are arranged at intervals each corresponding to a recording track length required to record one sector data.

4. A medium according to claim 1, wherein said recording track stores data containing an ECC, and said mark areas are arranged at intervals each corresponding to a recording track length that allows error correction of the ECC.

5. A medium according to claim 1, wherein said recording track is a groove, the groove includes a first wobble boundary wall indicating a first frequency, and a second wobble boundary wall indicating a second frequency different from the first frequency, and the second wobble boundary wall indicates the mark information.

6. A medium according to claim 1, wherein said recording track is a groove track, a land track is arranged between the groove tracks which neighbor in a radial direction, and the land track comprises pits indicating the mark information.

7. A medium according to claim 1, wherein said recording track is a groove, the groove includes a partial linear boundary wall and a wobble boundary wall indicating a predetermined frequency, and the partial linear boundary wall indicates the mark information.

8. A medium according to claim 1, wherein said recording track includes land and groove tracks, an n-th boundary of boundaries of the land and groove tracks is a first wobble boundary wall indicating a first frequency, an (n+1)-th boundary is a second wobble boundary indicating a second frequency, which is different from the first wobble boundary wall and the first frequency, and the second wobble boundary wall indicates the mark information.

9. A medium according to claim 1, wherein the mark areas which neighbor in the radial direction are offset by an n-byte length in a track direction.

10. An information recording apparatus for recording predetermined information on an information recording medium, said information recording medium, which is to undergo recording, comprising:

a recording track;

a plurality of address areas which are formed on said recording track and record address information; and mark areas, the number of which is larger than the number of address areas, and which are formed at predetermined intervals and include mark information, said information recording apparatus comprising:

mark detection section configured to detecting the mark information from the mark areas;

tracking control section configured to monitoring a tracking error based on the mark information detected by said mark detection section, and controlling a light beam to track said recording track; and recording section configured to reading the address information from said address areas, and recording predetermined information at a target position of said recording track on the basis of the read address information.

11. An apparatus according to claim 10, wherein the mark information of each mark area on said information recording medium on which said apparatus records information is independent from the address information, and can be present simultaneously with user data, and said recording section records the user data on said recording track near the mark information.

12. An apparatus according to claim 10, wherein said recording track on said information recording medium on which said apparatus records information stores data for respective sectors, said mark areas are arranged at intervals each corresponding to a recording track length required to record one sector data, and said recording section records one sector data at an interval said mark areas are arranged.

13. An information reproduction apparatus for reproducing information from an information recording medium, said information recording medium which is to undergo reproduction, comprising:

a recording track;

a plurality of address areas which are formed on said recording track and record address information; and mark areas, the number of which is larger than the number of address areas, and which are formed at predetermined intervals and include mark information, said information reproduction apparatus comprising:

mark detection section configured to detecting the mark information from the mark areas;

tracking control section configured to monitoring a tracking error based on the mark information detected by said mark detection section, and controlling a light beam to track said recording track; and reproduction section configured to reading the address information from said address areas, and reproducing predetermined information from a target position of said recording track on the basis of the read address information.

14. An apparatus according to claim 13, wherein the mark information of each mark area on said information recording medium from which said apparatus reproduces information is independent from the address information, and can be present simultaneously with user data, and said reproduction section reproduces the user data from said recording track near the mark information.

15. An apparatus according to claim 13, wherein said recording track on said information recording medium from which said apparatus reproduces information stores data for respective sectors, said mark areas are arranged at intervals each corresponding to a recording track length required to record one sector data, and said reproduction section reproduces one sector data at an interval said mark areas are arranged.

* * * * *